US010275830B2

(12) United States Patent
Renalds

(10) Patent No.: US 10,275,830 B2
(45) Date of Patent: *Apr. 30, 2019

(54) IN-LINE FIX PACKET TRANSLATOR

(71) Applicant: Trading Technologies International, Inc., Chicago, IL (US)

(72) Inventor: Andrew Theodore Renalds, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,283

(22) Filed: Oct. 24, 2017

(65) Prior Publication Data
US 2018/0060962 A1 Mar. 1, 2018

Related U.S. Application Data

(63) Continuation of application No. 15/218,649, filed on Jul. 25, 2016, now Pat. No. 9,830,658, which is a continuation of application No. 13/732,064, filed on Dec. 31, 2012, now Pat. No. 9,426,245.

(51) Int. Cl.
G06F 15/16 (2006.01)
G06Q 40/04 (2012.01)
H04L 29/08 (2006.01)
H04L 12/46 (2006.01)
H04L 12/741 (2013.01)

(52) U.S. Cl.
CPC ......... G06Q 40/04 (2013.01); H04L 12/4633 (2013.01); H04L 45/74 (2013.01); H04L 67/2823 (2013.01)

(58) Field of Classification Search
CPC . H04L 67/2823; H04L 12/4633; H04L 45/74; G06Q 40/04
USPC .................................................. 709/246, 230
See application file for complete search history.

(56) References Cited

U.S. PATENT DOCUMENTS

| 8,131,628 | B2 | 3/2012 | Channasagara |
| 9,426,245 | B2 | 8/2016 | Renalds |
| 2003/0167223 | A1 | 9/2003 | Pledereder et al. |
| 2011/0092221 | A1 | 4/2011 | Zubas et al. |
| 2011/0288960 | A1 | 11/2011 | Rooney |
| 2012/0239770 | A1 | 9/2012 | Noldus et al. |
| 2013/0148547 | A1 | 6/2013 | Page et al. |
| 2014/0189161 | A1 | 7/2014 | Renalds |

(Continued)

Primary Examiner — Oscar A Louie
Assistant Examiner — Oluwatosin M Gidado
(74) Attorney, Agent, or Firm — McDonnell Boehnen Hulbert & Berghoff LLP

(57) ABSTRACT

Certain embodiments provide systems and methods to perform in-line translation of message content according to FIX protocol variants in a trading system. An example method includes receiving, at a computing device, a message formatted according to a FIX protocol, the message including message content and a message wrapper, the message wrapper providing session and delivery information for the message to a target. The example method includes performing in-line translation of the message content of the received message to adjust the message content according to a predefined set of rules without affecting the message wrapper (with the possible exception of the message size) and message routing session. The example method includes facilitating routing of the message to the target based on the message wrapper.

10 Claims, 9 Drawing Sheets

(56) References Cited

U.S. PATENT DOCUMENTS

2014/0310146 A1 10/2014 Milne
2016/0335721 A1 11/2016 Renalds

IN-LINE FIX PACKET TRANSLATOR

CROSS REFERENCE TO RELATED APPLICATIONS

This application is a continuation of U.S. patent application Ser. No. 15/218,649, filed on Jul. 25, 2016, now U.S. Pat. No. 9,830,658, which is a continuation of U.S. patent application Ser. No. 13/732,064, filed on Dec. 31, 2012, now U.S. Pat. No. 9,426,245, the entire contents of each of which are incorporated herein by reference for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

The Financial Information eXchange (FIX) protocol is a series of messaging specifications for electronic communication of trade-related messages. The FIX protocol is used as a messaging standard used to facilitate electronic trade-related transactions. Rather than software, the FIX protocol is a specification around which software developers can create commercial and/or open-source software, for example.

The FIX protocol enables integration of different financial systems by establishing a standardized language. That is, the FIX protocol provides a document that describes a "language" for trading applications to speak with each other.

The FIX protocol defines a set of data fields (referred to as tags) that describe financial transactions. However, a single piece of data can be interpreted in many different ways depending upon client, exchange, etc. For example, tag 55 represents the symbol of a tradeable instrument. Some traders use the Bloomberg symbol, some use the Reuters symbol, some use custom names, and some use an exchange-defined symbol, for example. Thus, in many instances, devices communicating in FIX may need to route messages through an external, third party converter to enable devices to talk to each other regarding what is, in fact, the same piece of data.

BRIEF DESCRIPTION OF THE FIGURES

Certain embodiments are disclosed with reference to the following drawings.

Figure 1:
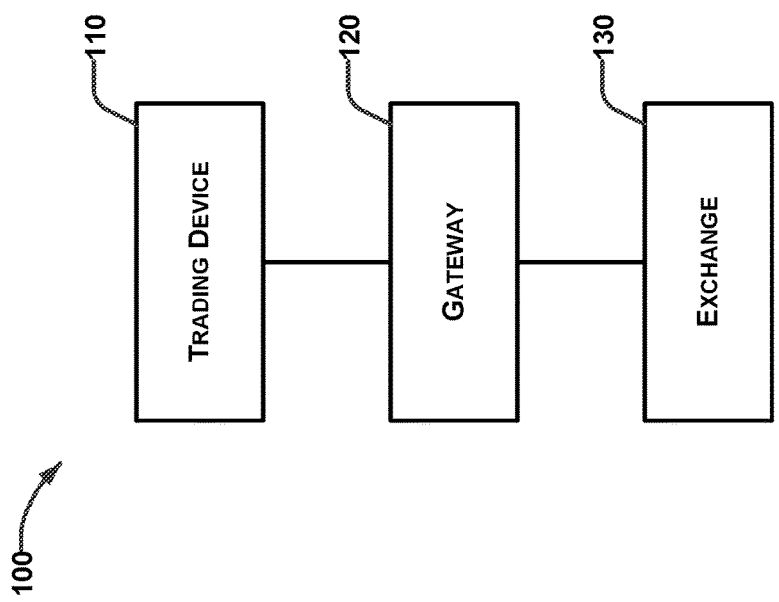
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

Different devices in a trading system may employ variants of the FIX protocol in which to define messages being exchanged to place orders, provide status, etc. While these variants exist, it is important for devices to be able to understand each other, particularly in communication between a trading device and an exchange. While an external translator can be inserted into the trading system, the external, third party translator disrupts the message sequence and affects a message's "envelope" used to deliver the message to an intended target, as well as the content of the message which is to be translated.

Embodiments disclosed herein recognize that messages must be readable by recipient while trackable by sender without appreciable increase in delivery latency that may adversely impact a trade order. Unlike prior trading systems and external translators, embodiments disclosed herein accommodate a plurality of FIX variants in communication between devices in an electronic trading system. Embodiments disclosed herein provide an in-line translator to adjust FIX content in a message while maintaining an original message envelope and session information, with the possible exception of the message size.

Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

Examples described herein enable a method including receiving, at a computing device, a message formatted according to a FIX protocol, the message including message content and a message wrapper, the message wrapper providing session and delivery information for the message to a target. The example method includes performing in-line translation of the message content of the received message to adjust the message content according to a predefined set of rules without affecting the message wrapper (with the possible exception of the message size) and message routing session. The example method includes facilitating routing of the message to the target based on the message wrapper.

Examples described herein enable a system including a computing device configured to receive a message formatted according to a FIX protocol. The message includes message content and a message wrapper. The message wrapper provides session and delivery information for the message to a target. The example computing device is configured to perform in-line translation of the message content of the received message to adjust the message content according to a predefined set of rules without affecting the message wrapper (with the possible exception of the message size) and message routing session and to facilitate routing of the message to the target based on the message wrapper.

Examples described herein enable a tangible computer-readable storage medium comprising instructions that, when executed, cause a computing device to at least receive a message formatted according to a FIX protocol, the message including message content and a message wrapper, the message wrapper providing session and delivery information for the message to a target; perform an in-line translation of the message content of the received message to adjust the message content according to a predefined set of rules without affecting the message wrapper (with the possible exception of the message size) and message routing session; and facilitate routing of the message to the target based on the message wrapper.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide a method including detecting, using a computing device, a current position of a cursor with respect to a trading interface. The example method includes evaluating, using the computing device, one or more candidate locations in the trading interface for a next cursor position based on at least one rule and at least one condition. The example method includes facilitating, using the computing device, adjustment of the trading interface based on the one or more candidate locations to enlarge at least one of the one or more candidate locations in the trading interface.

Certain embodiments provide a system including a cursor position locator to detect a current position of a cursor with respect to a trading interface. The example system also includes an interface adjustment processor to evaluate one or more candidate locations in the trading interface for a next cursor position based on at least one rule and at least one condition and facilitate adjustment of the trading interface based on the one or more candidate locations to enlarge at least one of the one or more candidate locations in the trading interface.

Certain embodiments provide a tangible computer-readable storage medium comprising instructions that, when executed, cause a computing device to at least detect a current position of a cursor with respect to a trading interface. The example instructions also cause the computing device to at least evaluate one or more candidate locations in the trading interface for a next cursor position based on at least one rule and at least one condition. The example instructions further cause the computing device to at least facilitate adjustment of the trading interface based on the one or more candidate locations to enlarge at least one of the one or more candidate locations in the trading interface.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
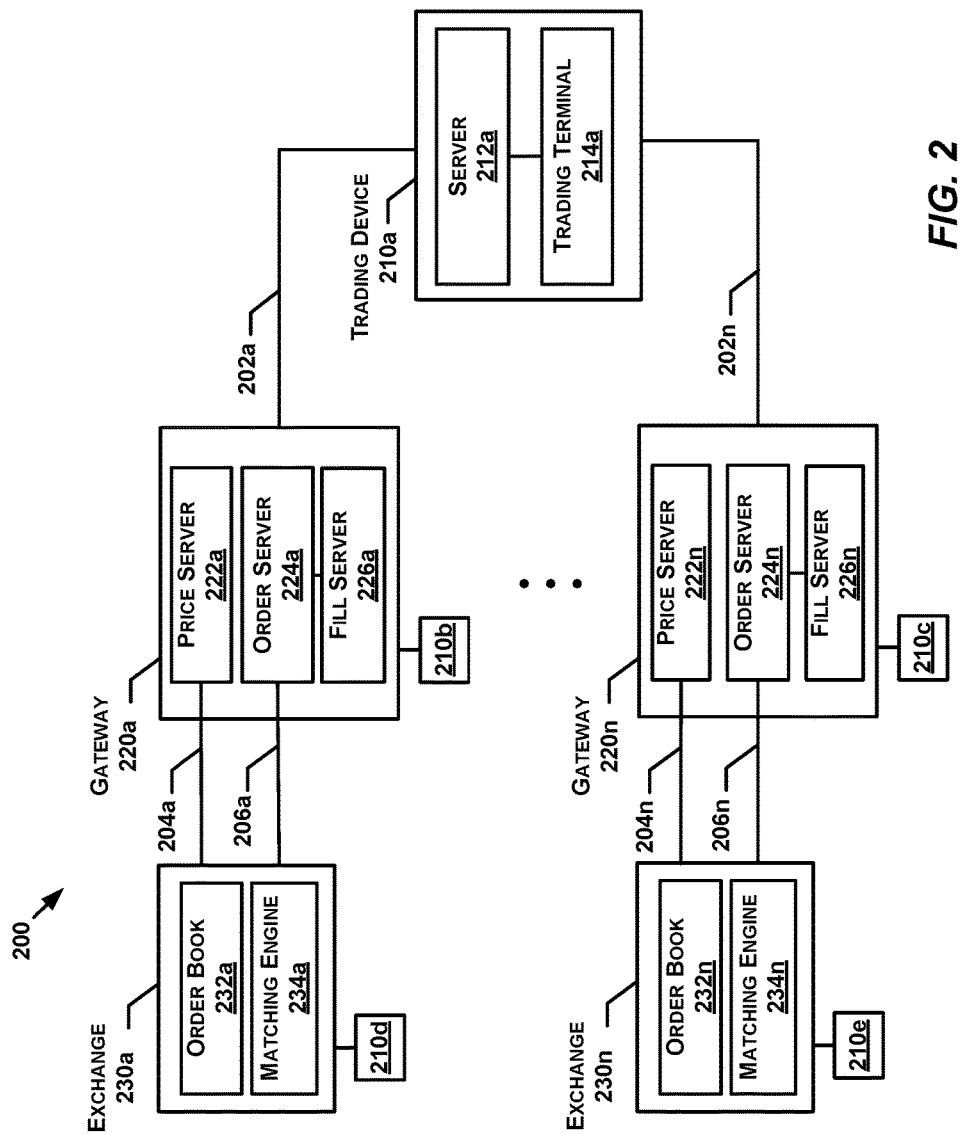
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
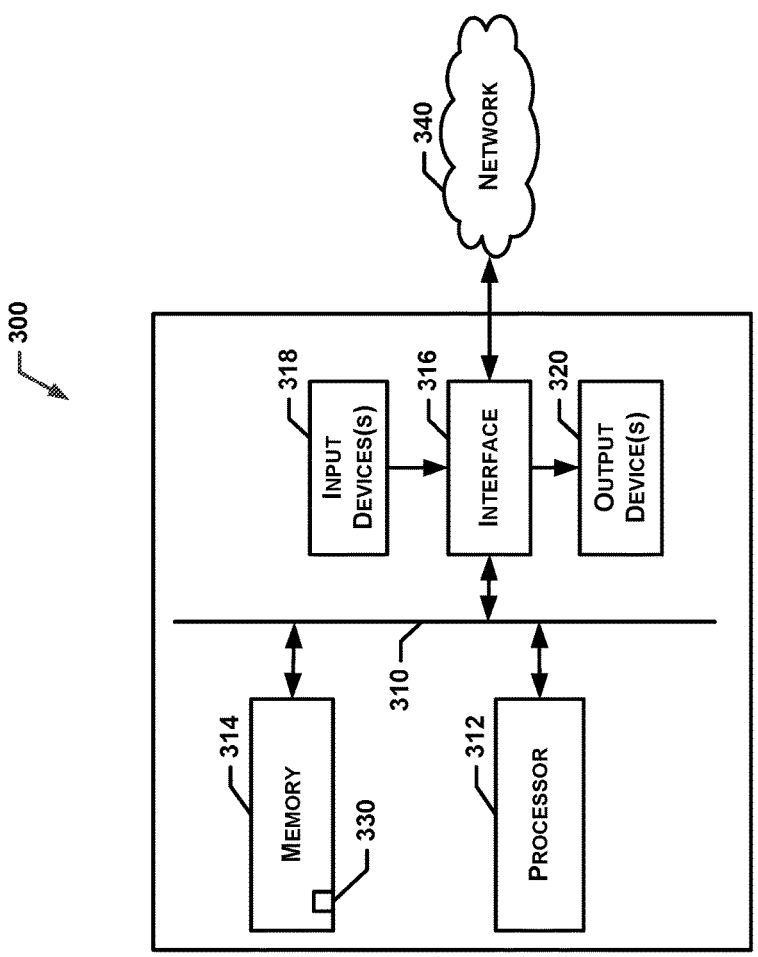
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Example In-Line Packet Translator

Figure 4:
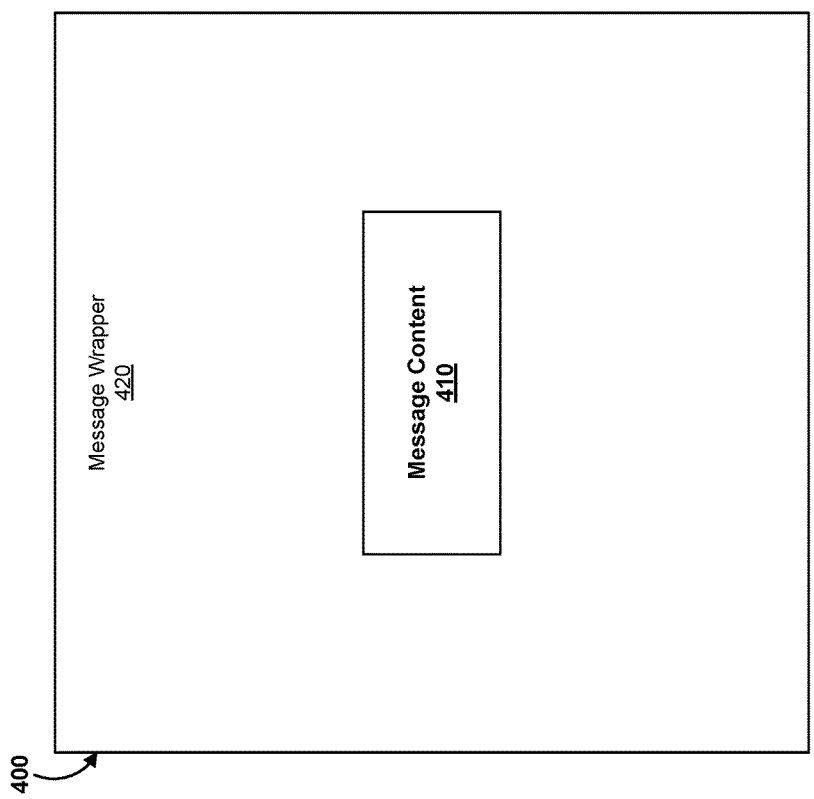
FIG. 4 depicts an example data message arranged according to the FIX protocol.

Trade order and/or other messages can be transmitted between client devices (e.g., a trading device, an exchange, a gateway, etc.) according to a transmission protocol, such as the FIX protocol. While the FIX protocol is a standard, each user often has its own dialect or variant of FIX. Using the FIX protocol, a data message 400 can be organized as illustrated in FIG. 4 including content 410 and a message wrapper or envelope 420. While the message wrapper 420 may be standard according to FIX or other network communication protocol, the message content 410 varies according to sender.

Using the FIX protocol, a client device can transmit and/or receive trading and/or other financial transaction data. However, different FIX client devices, such as trading systems 100 and 200, and/or trading system components, such as trading devices 110 and 210a, gateways 120 and 220a-220n, exchanges 130 and 230a-230n, and computing device 300, etc., may communicate using different variants of or with different modifications to the FIX protocol. To analogize, one client device may be communicating in a first Spanish dialect and another client device may be communicating in a second Spanish dialect such that the client devices cannot understand messages from one another. Just because both devices utilize the FIX protocol does not necessarily indicate that they can understand messages from one another. A dialect or variation may need to be determined first. Typically, large staffs of people are involved in translating message content to accommodate FIX communication.

A third party device (such as UL Bridge provided by ULLINK, Inc. of New York, N.Y. ("ULLINK")) can be provided between FIX client devices to receive and translate messages, but the third party device must involve both client devices to identify and resolve communication problems. For example, if confusion or other error arises over communication of messages between a trading device and an exchange, both the trading device operator as well as exchange personnel are involved in resolving the error along with the provider of the third party translator device. Such three-party collaboration can result in a large commitment of time and resources to figure out who translated what, when, and how, for example.

In addition, in FIX or other networking protocol, a packet identifier (ID) or sequence number is used to identify and track message packets. For example, if a trading device and an exchange are communicating with respect to an order, the trading device may send a message with a first sequence number which, in turn, may be translated by a third party device and assigned a second sequence number. The translated message is then provided to the exchange with the second sequence number different from the first sequence number. Thus, the trading device and the exchange are having two different "conversations", especially if the third party adapter is being used. The communicating devices must keep track of the differences in message sequence number in order to process messages that each device receives from the other.

Different devices may generate messages with different frequency and with different numbering while message data packets are processed according to the assigned sequence number. For example, if a receiving device receives sequence numbers 1, 2, 3, and 5, then the receiving device saves message sequence number 5 until it receives sequence number 4. The receiving device may also communicate with the sender to indicate that sequence number 4 was not received and may ask the sender to re-send message sequence number 4. In the meantime, message sequence numbers 6, 7, and 8 may be queuing up with sequence number 5, waiting for sequence number 4 to be received. Message queuing can delay trades as a receiving device waits for what it thinks is a missing message. Further, the sending device may not know what message sequence number 4 or 5 is, because the sending device sent a message with sequence number 45. Thus, timing, order, efficiency, etc., of messages can be affected.

Message sequence numbering affects a degree of correlation between data sent and data received. If a translation occurs in-line and both sending and receiving devices are having the same conversation, there is a higher degree of correlation between what was sent and what was received. With a third party translator, however, message correlation is disrupted, and, often, the sending party, receiving party, and translating party are involved in sorting out and attempting to resolve any miscommunication and/or translation error.

Referring back to the example of FIG. 4, application level data applies or refers to the content 410 of the message 400, while admin or session level data impacts or describes the wrapper 420. At the session or network layer, if the sending and receiving devices are processing different sequence numbers, a possibility for error or at least confusion is likely. Thus, if the sending device is transmitting a sequence of messages according to a first numbering (e.g., 1, 2, 3, 4, etc.), and the receiving device is seeing different sequence numbers (e.g., 45, 50, 55, etc.), no continuity in session level messages is facilitated between the devices.

In one or more of the disclosed embodiments, the content 410 of the message 400 contained within the application level data is preserved. If the message wrapper or envelope remains the same (with the possible exception of the message size), in the view of the sending and receiving devices, the message packet itself remains the same. Rather than assembling a new message envelope and effectively starting a new "conversation" or exchange of messages, a message packet can be modified in content only, leaving the packer wrapper or envelope untouched (except for updating its size) through the message delivery or routing session. By opening the message mid-transmission between a sending device and a receiving device and changing the message content according to a predefined set of rules (e.g., from FIX dialect 1 to FIX dialect 2, from English to Spanish, etc.), essentially the same message is being forwarded as part of ongoing communication or conversation between sending and receiving devices.

Figure 5:
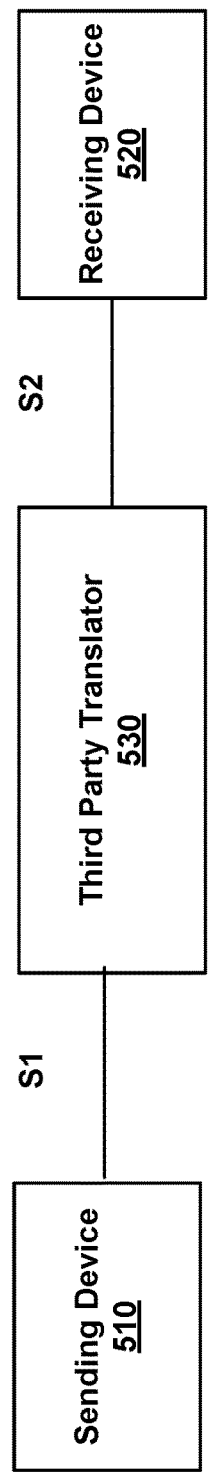
FIG. 5 depicts an example message exchange sequence between two devices using a third party translator.

For example, as shown in FIG. 5, suppose a sending device 510 has established a first communication session S1, and a receiving device 520 has established a second communication session S2, with the third party translator 530 forcing the establishment of the separate communication sessions S1, S2. The sending device 510 has a heartbeat interval of 30 seconds. The heartbeat interval provides timing for the device 510 to send a heartbeat back and forth periodically (e.g., every 30 seconds) with the receiving device 520 to make sure the conversation between devices 510, 520 stays alive. In the example, the receiving device 520 has a heartbeat interval of 2 seconds. Due to the difference in heartbeat interval between the devices 510, 520 and the introduction of the third party translator 530, after 30 seconds, the sending device 510 is on sequence #2, and the receiving device 520 is on sequence #15. Based on the disparity in message sequence number, no synchronicity is provided in the communication between the sending device 510 and the receiving device 520.

Lost messages, delayed messages, and/or other errors can be difficult to diagnose and remedy. For example, suppose the sending device sends an order as message sequence #2. When the sending device sends the order message, an order identifier (ID) is undefined because the order message has not reached the exchange yet. Inquiries made to determine the message status are complicated because the order ID known to the trader can be different than the order ID known to the broker. For example, the trader identifies the message as having sequence #2, which is the trader's message sequence number. When the broker looks up message sequence 2, the message is a heartbeat message because the broker has a different series of message sequence numbers than the trader. The broker sees an order message received at sequence #15, but the trader has not even sent sequence #15 in its numbering scheme yet. Thus, neither the trading device nor the broker can identify the message and determine where the message went.

However, if a single, direct message routing session is established from the sending device to the receiving device (e.g., from the trading device to the exchange), then each participating device knows status and location throughout the order delivery path. Adjustment in FIX protocol format is facilitated by tweaks to the application level data, not the session level data, which is left alone, except for the message size. Even though a message is tweaked to modify the content, the message reaches its destination and returns, and the sending device can determine its latency. With two separate lines of communication handing off to deliver a message, there is no such insight into message delivery time and latency.

That is, if a separate adapter through which messages can be routed is introduced, a first FIX client (e.g., a trading device) may not be aware of delays between an adapter and a second FIX client (e.g., an exchange) since message continuity is broken by the presence of the adapter, which generates a second message to the second FIX client based on a first message received at the adapter from the first FIX client. For example, since the trading device message is replaced by a message from the adapter to the exchange (thereby receiving a new sequence number), the trading device is unaware of when the message gets to the exchange (e.g., the exchange indicates it received message #2, but the trading device thinks it sent message #25 such that the trading device and exchange cannot confirm that the correct message was sent and received).

However, if a message communication session is established directly between a trading device and an exchange, then the trading device knows when a message from the trading device is received by the exchange, regardless of whether or not the trading device and exchange follow the same sequence numbering. A low-level packet translator can be provided between a first FIX client and a second FIX client to adjust message content without requiring either of the first or second FIX clients to modify its treatment of the FIX protocol.

For example, a single FIX session can be facilitated between the first FIX client and the second FIX client using an in-line FIX translator. Thus, one FIX session can be maintained rather than two or more separate but related FIX sessions, for example. A FIX packet translator residing between FIX clients adjusts business content of each message packet per a predefined set of rules. Session-level logic, however, can be left unchanged by the FIX translator. That is, per the example message 400 of FIG. 4, the content 410 can be changed while the wrapper 420 remains the same except possibly for the message size.

In more detail, in a single FIX session, one or more messages are passed from one client to another. Each message is divided into one or more data packets (e.g., TCP/IP data packets). Each packet is associated with a packet identifier and/or sequence number. While a separate, third party translator (e.g., ULLINK) changes the sequence number of a packet, the in-line translator leaves the sequence number of a packet unchanged. An adjustment of a packet sequence number can impact a trading and/or other operation of a trading system. For example, trades can be queued and processed based on sequence number, and a change in sequence number can result in a change in an order of processing of packets (and therefor messages) for a trade.

In a trade-related (e.g., FIX) message, session-level logic provides an envelope or wrapper for message content. Using the in-line translator, the original message wrapper and FIX session are maintained while the message content is adjusted to help ensure communication and understanding of messages between the clients. In certain embodiments, the in-line FIX translator has a session context, knows a message sequence, and knows a format to expect to facilitate message passing rather than having two clients talk through a separate, intermediary system.

By maintaining a single conversation or message sequence between devices and only modifying application level data in a message, a sending device can track a message throughout delivery and reply. By tracking a message session, the sending device can determine message latency, etc.

Figure 6:
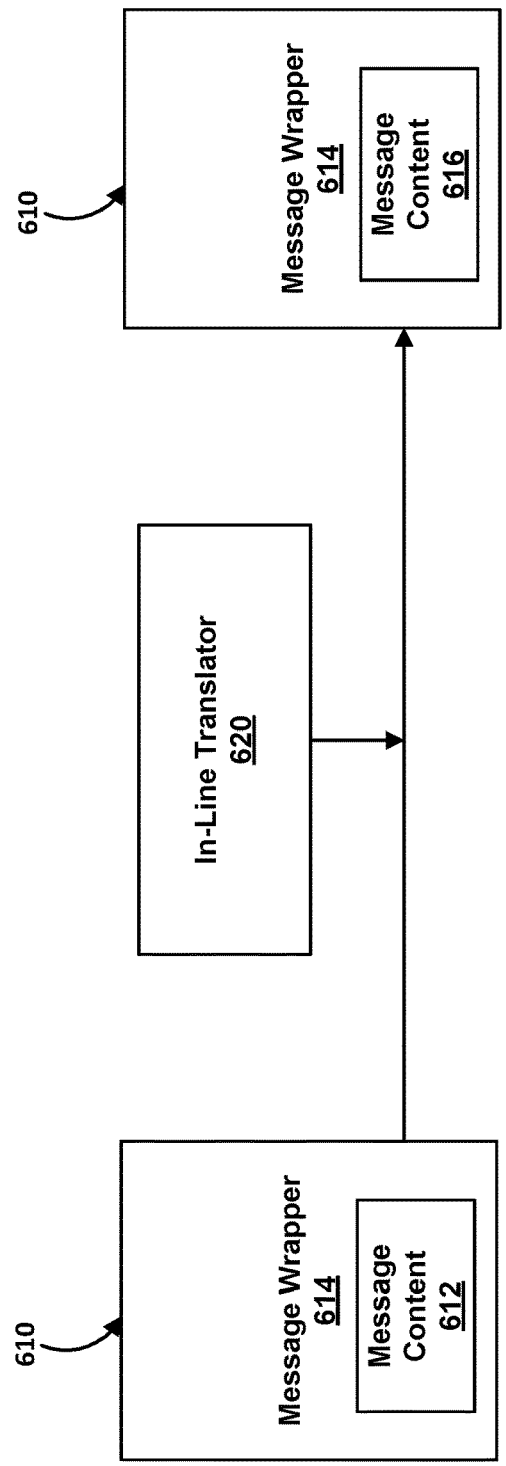
FIG. 6 shows an example translation of message content from a sender to a recipient via an in-line translator.

An example in-line translator maintains an original message and modifies one or more fields in the message body without generating or changing the message header with the possible exception of the message size. As shown in the example of FIG. 6, a message 610 includes content 612 that is directed from a sender to a receiver based on a message wrapper 614. Using an in-line FIX translator 620, the message content 612 is modified by the in-line translator 620 to produce modified message content 616 in the message 610. The in-line translator 620 opens the message 610 in midstream between FIX client devices (e.g., between a trading device and an exchange) to adjust the content 616 and send the message 610 along in the same wrapper 614 (with the possible exception of updating the message size) without creating a new message or starting a new conversation.

The in-line translator 620 can be located in a variety of positions within a trading network. For example, the translator 620 can be located at a high-speed switch with a field programmable gate array (FPGA) to provide an in-line translation or adjustment of the message 610 as the switch is passing the message 610 between FIX clients. A hardwired translator provides translation without sacrificing speed, for example.

If a gateway (e.g., gateway 220a-220n) is present, the in-line translator 620 can be placed on a switch between the gateway and the exchange, for example. In certain examples, a gateway is provided for each exchange to accommodate exchanges that communicate via FIX differently from each other. In certain examples, the in-line translator 620 can be provided with a single gateway to accommodate a plurality of exchanges communicating with a plurality of FIX variations.

Figure 7:
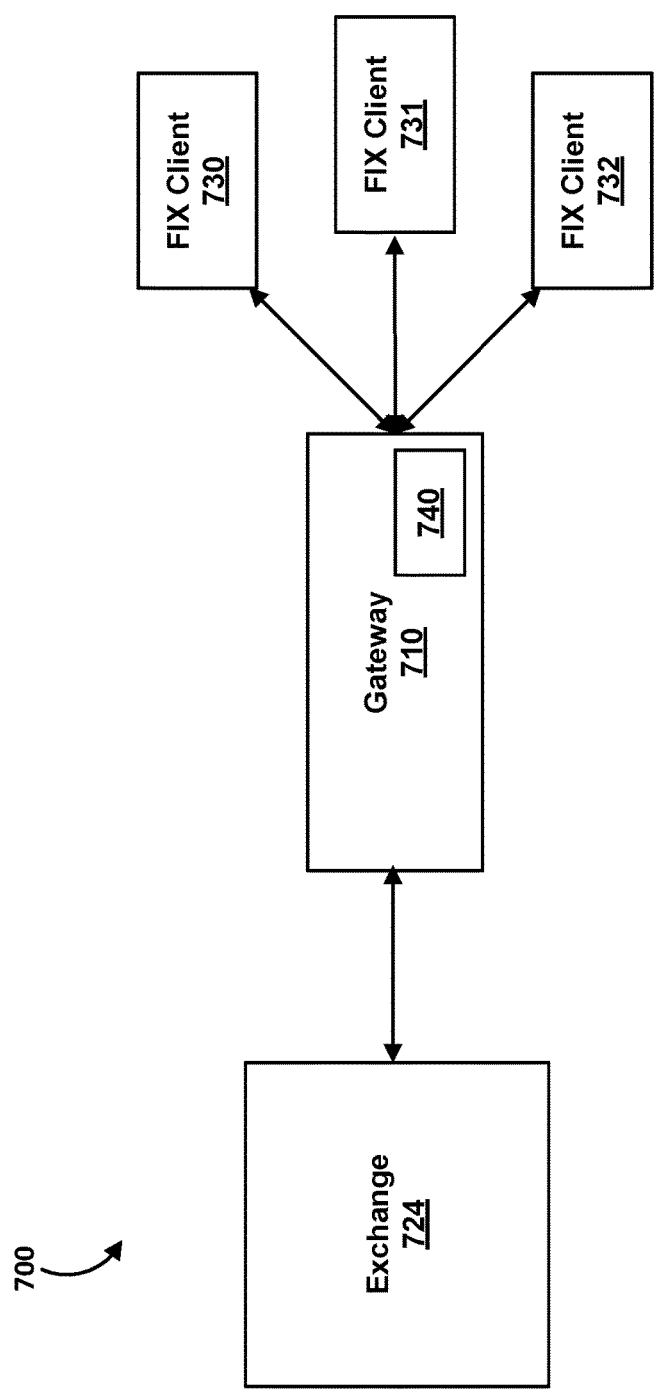
FIG. 7 illustrates an example trading system in which a gateway with an in-line translator is arranged between an exchange and a plurality of FIX clients.

For example, FIG. 7 illustrates an example trading system 700 in which a gateway 710 is arranged between an exchange 720 and a plurality of FIX clients 730-732 (e.g., trading device 110, 210a, computing device 300, etc.). An in-line translator 740 is arranged at or near the gateway 710 (e.g., on a network transmission switch associated with or forming the gateway 710) to modify message traffic communicated between the one or more FIX clients 730-732 and the exchange 720 via the gateway 710. In the example, rather than arranging a separate gateway for each FIX client to communicate with the exchange 720, a single gateway 710 facilitates communication with the exchange 710 for the plurality of clients 730-732.

Via the single gateway 710 and corresponding in-line translator 740, communications between the exchange 720 and any of the FIX clients 730-732 can be facilitated. In certain examples, a plurality of exchanges 720 can be similarly interfaced with a plurality of FIX clients 730-732 through the single gateway 710 and in-line translator 740. By leaving the session level of a message untouched, a continuous session is maintained for message delivery while allowing the translator 740 to adjust message content at the application level to account for differences in syntax, phrasing, format, etc., between FIX versions employed by a FIX client 730-732 and the exchange 720.

Rather than providing a specific gateway for each client 730-732 and/or exchange 720, the single gateway 710 provides added flexibility without sacrificing speed, tracking, and/or reliability. Translation and/or other adjustment between FIX variants can be facilitated by storing an agreed-upon mapping of terms (e.g., a predefined set of rules, etc.) between one or more FIX variants used by one or more of the FIX clients 730-732 and the exchange 720 to communicate, for example.

VI. Example Methods to Dynamically Adjust Message Content

Figure 8:
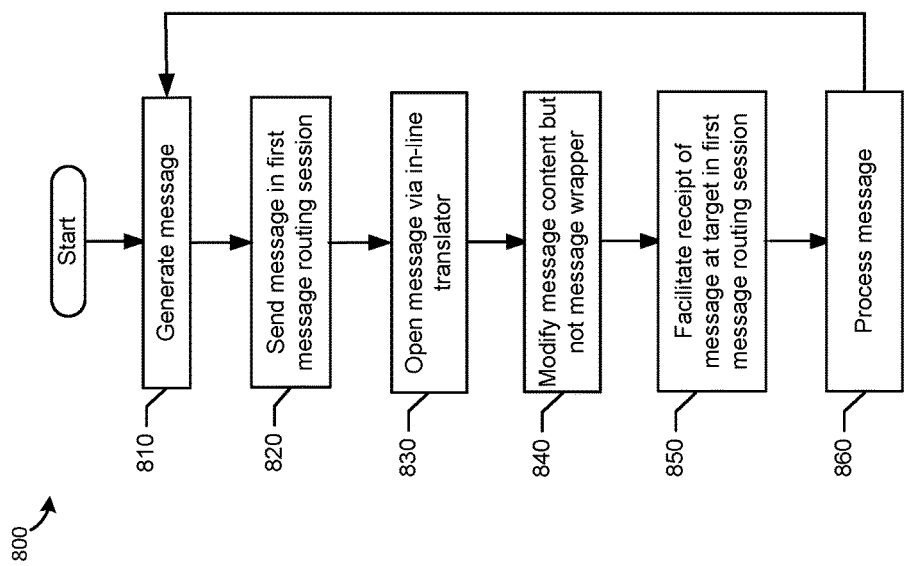
FIG. 8 illustrates a flow diagram of an example method to dynamically adjust or translate message packet content without affecting a message packet wrapper.

FIG. 8 illustrates a flow diagram of an example method 800 to dynamically adjust or translate message packet content without affecting a message packet wrapper. At block 810, a message is generated according to a FIX protocol. For example, a trading device generates an order message according to a FIX variant used by a trader. The message includes content generated at an application level (e.g., a trade order) according to the FIX protocol (or a variant thereof) and routing information or a "wrapper" generated at a session level according to the FIX protocol (or a variant thereof). At block 820, the message is sent according to a first message routing session. For example, the trading device used to generate the message transmits the message to an intended target (e.g., an exchange). The target is determined from the wrapper or session-level information of the message, for example.

At block 830, an in-line translator opens the message. For example, the message is sent via a gateway or switch which includes an in-line translator that examines the content of the message without affecting the routing session in which the message is sent. At block 840, the in-line translator modifies the content of the message according to a predefined set of rules without affecting the message wrapper with the possible exception of the message size. For example, the trade order in the message content can be converted from a trader client's FIX format to a FIX format employed by the target exchange. The in-line translator can affect a quick adjustment of the content without altering the message wrapper or envelope and without noticeably slowing delivery of the message to its intended target (e.g., the exchange).

At block 850, receipt of the message at the target is facilitated according to the first message routing session. For example, the exchange receives the order message from the trading device. By adjusting the message content without modifying the message session level information, the sending device (e.g., the trading device) can receive and understand confirmation of the message delivery. For example, if the order message is message number two to the trading device but message number fifteen to the receiving exchange, each of the devices involved can interpret the message according to its own messaging numbering because the message routing session has been maintained and unmodified. That is, to the trading device, message number two was delivered, while to the exchange, message number fifteen was received. By way of contrast, systems that include a translator device are required to deal with the disruption of message session data caused by the intermediary device.

At block 860, the message is processed by the receiving device. For example, the exchange processes the message content to facilitate a trade order contained in the message content. The process 800 repeats as messages are exchanged between devices in a trading system, for example.

Figure 9:
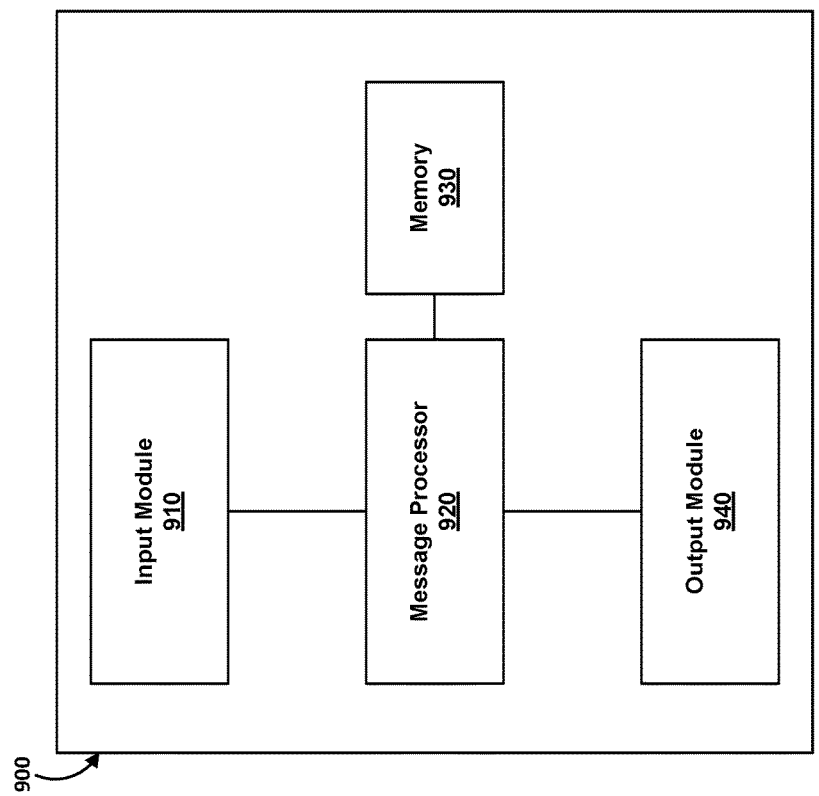
FIG. 9 illustrates a block diagram representative of an example in-line translator to facilitate in-line translation or modification of message content without affecting the message wrapper.

FIG. 9 illustrates a block diagram of an example in-line translator 900 to facilitate in-line translation or modification of message content without affecting the message wrapper. The example in-line translator 900 includes an input module 910, a message processor 920, memory 930, and an output module 940. The input module 910, message processor 920, memory 930, and output module 940 can be implemented in one or combinations of hardware, firmware, and/or software. For example, one or more components of the translator 900 can be implemented using an FPGA at a gateway, other network transmission switch, trading device, exchange, etc. In an example, implementing the translator 900 in hardware helps to reduce latency and improve speed versus a software implementation, for example.

The input module 910 receives a data message and routes it to the message processor 920 to be processed. The message processor 920 operates at the application level to map FIX content in the received message to a format expected by an intended target (e.g., a trading device or exchange) for the message. For example, the memory 930 can store a dictionary or mapping (e.g., a hardcoded or firmware-enabled mapping, a software dictionary, etc.) from one FIX variant to another (e.g., from a trader's FIX dialect to a FIX dialect used by a market exchange). Once the message content is adjusted appropriately, the output module 940 receives the message and continues the message on its way to its intended target.

By manipulating only the application level content, delivery information is maintained at the session level. In contrast, by introducing a separate third party translator that replaces a first message with a translated second message, a first message session is terminated and a separate second session is created, resulting in a loss of continuity and tracking and an increase in delivery time, latency, etc. By installing an in-line component at a trading device, exchange, gateway, high speed switch, etc., a message, which is already passing though the device, can be modified transparent to the message and sending and/or receiving devices, for example. In an example, by providing a hardware and/or firmware-based translation of message content into a normalized format, an order can be sent and routed through a gateway in under one second (e.g., approximately 200 microseconds). In-line, application level translation thereby reduces or minimizes an impact of translation of message latency and response time to complete an order as well as reduces or minimizes erroneous orders and/or other errors resulting from incorrect translation or understanding of a message by an exchange, for example.

In certain examples, to accommodate a variety of FIX variants and a variety of preferences, one or more users can be provided with interfaces and tools to input FIX variant mappings or translations of terms to be used by the in-line translator 900 (e.g., stored in the memory 930 and referenced by the message processor 920, stored in an external storage and referenced by the message processor 920, etc.). Through translation, any number of variants can be accommodated and internal proprietary formats can be supported while providing a translation to a more standardized format for an exchange without a plurality of customized, costly, and delay-intensive translation devices interfering with message delivery.

Thus, certain embodiments provide dynamic message adaptation at the application or message content level while leaving the message's session level delivery information (e.g., the message's envelope) undisturbed. Certain embodiments maintain a continuity of message delivery for tracking, verification, auditing and/or reliability purposes while helping to ensure that a message can be read and understood by an intended target.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A computing device configured to:
receive a message from a sender device to be sent to a target device, wherein the message is formatted according to a FIX protocol, the message including FIX message content and a FIX message wrapper, the FIX message wrapper providing session and delivery information for the message, and the message content including trade order information formatted according to a first FIX protocol format;
perform in-line translation of the received message to generate a modified message, wherein to perform the in-line translation of the received message, the computing device is configured to:
determine mapping data to translate the message content from the first FIX protocol format being used by the sender device to a second FIX protocol format being used by the target device;
use the mapping data to translate the trade order information in the message content from the first FIX protocol format to the second FIX protocol format to generate translated trade order information for the modified message;
refrain from modifying session and delivery information in the FIX message wrapper; and
route the modified message to the target device based on the delivery information in the FIX message wrapper.

2. The computing device of claim 1, wherein the in-line translation does not affect a message routing session.

3. The computing device of claim 1, wherein the message is composed for processing at an application level and a session level, the application level affecting the FIX message content, and the session level affecting message identification and delivery instructions in the FIX message wrapper, wherein the in-line translation modifies the FIX message content at the application level while not affecting the identification and delivery instructions at the session level.

4. The computing device of claim 1, wherein to refrain from modifying session and delivery information in the FIX message wrapper, the computing device is configured to maintain a message sequence number for tracking by a sender of the message.

5. The computing device of claim 1, wherein the sender device using the first FIX protocol format comprises a client device, and wherein the target device using the second FIX protocol format comprises an electronic exchange.

6. The computing device of claim 1, wherein the computing device is a gateway.

7. The computing device of claim 1, wherein the computing device is a switch.

8. The computing device of claim 1, wherein the FIX message wrapper is a FIX message envelope.

9. The system computing device of claim 1, wherein the sender device is a FIX client device.

10. The system computing device of claim 1, wherein the mapping data comprises mapping of terms between the first FIX protocol format and the second FIX protocol format.

* * * * *